United States Patent [19]

Dumas et al.

[11] Patent Number: 4,935,253
[45] Date of Patent: Jun. 19, 1990

[54] PROCESS AND INSTALLATION FOR THE MANUFACTURE OF A COMPLEX EGG-BASED PRODUCT

[75] Inventors: Frederic Dumas, Lomme; Franck Bouttemy, Achicourt; Jean-Francois Rochas, Caluire; Jean-Marie Jacomino, Foch; Christian Huc, Arras, all of France

[73] Assignee: OV'Action S.A., Lievin, France

[21] Appl. No.: 288,293

[22] Filed: Dec. 22, 1988

[30] Foreign Application Priority Data

Aug. 3, 1988 [FR] France .................... 88 10763

[51] Int. Cl.$^5$ .................... A23B 5/00; A23B 1/00
[52] U.S. Cl. .................... 426/243; 426/274; 426/515; 426/614
[58] Field of Search ............ 426/243, 614, 512, 515, 426/274

[56] References Cited

U.S. PATENT DOCUMENTS 4,822,628  4/1989  Huc .................... 426/512

Primary Examiner—George Yeung
Attorney, Agent, or Firm—Shenier & O'Connor

[57] ABSTRACT

The invention consists of the following steps:
(a) continuously feeding n1 containers with fresh liquid egg white and n2 containers with fresh liquid egg yolk, the containers having the same shape and being made of a material inert to microwaves, the sum of $n=n1+n2$ being equal to at least two and n1 being either equal to n2 or different from n2 by one unit,
(b) subjecting each liquid egg product to the action of microwaves so that it coagulates in the container, in the form of a homogeneous layer, without however reaching the hard cooked state,
(c) extracting the layers from the containers and superposing the extracted layers so that a layer based on liquid egg white alternates with a layer based on liquid, egg yolk, and
(d) subjecting the superposed layers to a complementary heat treatment to achieve the desired degree of cooking while at the same time ensuring the complexing of the different layers.

Preferably, each container is a continuous band (8, 9, 10) made of a material inert to microwaves and having a hollow relief. After it has passed through the microwave precooking chambers (22), each upper band (8, 9) has a descending path inclined towards the corresponding lower band (9, 10) so as to superpose the precooked layer. All the superposed layers then pass through the cooking and complexing chamber (34), after which the finished product is cut to the desired length.

21 Claims, 3 Drawing Sheets

PROCESS AND INSTALLATION FOR THE MANUFACTURE OF A COMPLEX EGG-BASED PRODUCT

The invention relates to the manufacture of an egg-based product, in the hard cooked state or a state close to it, comprising separate layers of white and yolk. It relates more particularly to an automatic process for the manufacture of this complex product and to the installation specially designed for carrying it out.

French patent No. 2.172.904 has disclosed a food product based on egg white and yolk in the hard cooked state, in which the white and yolk are in superposed and alternate, substantially plane layers. The manufacturing process described in the said patent consists in first breaking the eggs and then separating the whites and the yolks, taking care not to break the vitelline membrane surrounding each yolk, in cooking the yolks whole in their vitelline membrane, in shaping the cooked yolks, in cooking the white and shaping it and then in bringing the yolk and white into contact. In this process, it is imperative to cook the yolk of each egg individually in its membrane if it is desired to retain taste properties identical or analogous to those of a hard egg yolk which has been cooked, at the same time as the white, inside the original egg. This process is tricky to carry out and difficult to automate.

French patent No. 2.292.440 has disclosed a process for the manufacture of a complex egg-based product. This process consists in injecting the egg white into a cylindrical mold having an inner core, in precoagulating the white by bringing it to a certain temperature, in extracting the inner core, in introducing the preheated egg yolk into the central cavity left free by extraction of the inner core, in completing the coagulation of the white and yolk and in extracting the resulting cylindrical product from the mold. This process requires, in one and the same mold, a first operation for precoagulation of the white and then an operation for coagulation of the yolk. The product obtained is in the shape of a cylinder with egg white as the outer envelope and egg yolk as the core.

A process for the manufacture of a complex egg-based product in the form of superposed and alternate layers of white and yolk in the hard cooked state has now been found which is different from the known processes, and it is this which forms the subject of the invention. The process of the invention comprises the following four successive steps:

(a) a feeding step consisting in feeding n1 containers with fresh liquid egg white and n2 containers with fresh liquid egg yolk, the said containers having the same shape and being made of a material inert to microwaves, the number of containers being such that the sum $n = n1 + n2$ is equal to at least two and n1 is either equal to n2 or different from n2 by one unit, (b) a precooking step consisting in subjecting each liquid egg product to the action of microwaves so that it coagulates in the container, in the form of a homogeneous layer, without however reaching the hard cooked state, (c) a superposing step consisting in extracting the layers consisting of the coagulated liquid egg products from the containers and in superposing the extracted layers so that a layer based on liquid egg white alternates with a layer based on liquid egg yolk, and (d) a complexing step consisting in subjecting the layers superposed in this way to a complementary heat treatment, the purpose of which is to achieve the desired degree of cooking while at the same time ensuring the complexing of the different layers.

Thus, in the process of the invention, the precooking of the white and yolk is carried out in a single operation, in hidden time, by the action of microwaves. It has in fact been found that it is possible, by means of microwaves, to achieve adequate and homogeneous coagulation, for both the white and the yolk, in a short time. This coagulation can be adjusted so as not to reach the hard cooked state; as a result, after superposition of the precooked layers, the final heat treatment makes it possible to achieve the desired degree of cooking and ensure the complexing of the different layers with one another, i.e. a certain adhesion between one layer and the next, which gives the finished complex product its overall cohesion. The finished product is not a product formed of superposed and separable individual layers but a single manipulable product formed of layers bound together.

Advantageously, during the precooking step, each liquid egg product is kept in an atmosphere of saturated steam. This particular arrangement has the advantage of preventing the precooked layer from possibly drying out on the surface, the effects of such drying being firstly to limit the ability of one layer to complex with the next and secondly to spoil the appearance of the outer surface of the finished product.

In the case where it is desired to have a complex product of square cross-section in which all the superposed layers have the same dimensions, the process is such that, with the hollow part of each container having a rectangular cross-section, the feed of fresh liquid egg into each of the n containers is such that the height of the liquid egg in each container is equal to 1/n times the width of the container.

Furthermore, if it is desired to maintain the proportion of white to yolk which exists in an egg, namely two-thirds white to one-third yolk, in the simplest complex product, it suffices to feed three containers, one with liquid egg yolk and the other two with liquid egg white, and to superpose the precooked layers of liquid egg products so that the layer of yolk is sandwiched between the two layers of white.

In the preferred version of the process of the invention, the feed of fresh liquid egg products into each container is continuous, the said containers consisting of a band having a hollow relief, the precooking is carried out by passing the n bands through at least one chamber supplied with microwaves, and the product obtained after complexing is cut into individual products of the desired length and, if appropriate, cut to the desired width.

Thus the manufacturing process is totally continuous.

Advantageously, with the n bands located one above the other, the superposing of a first layer corresponding to an upper band on a second layer corresponding to a lower band is achieved by demolding the first layer and depositing the first layer, now demolded, on the second layer situated in the lower band. This is made possible by the fact that, after the precooking step, each layer, which is in a state of coagulation close to the hard cooked state, is manipulable and even relatively deformable. The upper layer can therefore follow a path which is not rectilinear but descending, until it is deposited on the lower layer. Thus, in a stepwise fashion, an upper layer (for example of white) will be deposited on a lower layer composed of two layers (one of yolk on top of one of white) until the n precooked layers have been superposed. Preferably, before they are superposed, the layers are kept at a temperature close to the precooking temperature, for example 73° C. Preferably, the bottom side of the upper layer, in particular where this is a layer of white, is dried before the said upper layer is superposed on the lower layer. The complementary heat treatment for cooking consists, for example, of the action of microwaves.

A further object of the invention is to protect an installation specially designed for carrying out the above-mentioned process. This installation comprises:

a. means for separately feeding fresh liquid egg white and fresh liquid egg yolk, b. n containers of identical shape, made of a material inert to microwaves, n being equal to or greater than 2, there being n1 containers for the white and n2 containers for the yolk and n1 being equal to n2 or different from n2 by one unit, c. means for precooking the liquid egg products present in the containers by means of microwaves, which are adjusted so that each liquid egg product coagulates homogeneously in the container without however reaching the hard cooked state, d. means for superposing the precooked layers of liquid egg products, and e. means for subjecting the superposed layers to a heat treatment, which are adjusted so as to ensure the complexing of the different layers and to achieve the desired degree of cooking.

The means for separately feeding fresh liquid egg products comprise two separate tanks, one for containing the liquid egg whites and the other for containing the liquid egg yolks, means for stirring the liquid egg products contained in each tank and the actual means for feeding the liquid egg products into the n containers. Stirring of the liquid egg products contained in each tank is necessary to ensure that they have a good homogeneity and hence that the product is of a constant quality.

In the preferred embodiment of the installation, each container consists of a continuous band having a hollow relief and the installation includes means for supporting each band and moving it continuously at the same speed. In this case, the actual means for feeding the fresh liquid egg corresponding to a band consists of a pipe coming out into the so-called feed zone above the hollow part of the band forming a continuous container, upstream of the precooking means.

The means for precooking by microwaves consist of a resonant cavity supplied by a slotted radiating guide and located downstream of the feed zone, in the direction of motion of the band. This cavity is provided with means for producing steam or preserving the steam released during precooking, which are capable of maintaining an atmosphere of saturated steam around the band during precooking. These means may be, for example, a plate, forming a cover, which is made of a material inert to microwaves and is placed on top of and around the band as it travels through the cavity. They may be, for example, a flat and continuous band made of a material impermeable to steam and inert to microwaves, which is provided with means of displacement capable of positioning it, as it moves inside the microwave chamber above the container, in such a way as to form a substantially leak-tight cover.

Preferably, the band has a slight inclination, being higher in the feed zone than in the zone where the microwaves are active. This inclination favors a constant feed by preventing any liquid egg from spreading upstream of the feed zone, and thereby ensures a good homogeneity in terms of the height of the precooked layer.

In the case where each container consists of a continuous band driven at the same speed, the means for supporting and continuously moving a band corresponding to a given precooked layer are located either above or below another band, depending on the position of the said layer in the finished product, and the superposing means consist of means for inclining that portion of an upper band which is situated downstream of its precooking means towards that portion of a lower band which is situated downstream of its precooking means, and of means for returning the upper band, creating a sudden change in direction, when the said upper band is just above the lower band. The sudden change in direction of the upper band, which is preferably of the order of 140° to 170°, favors the separation of the precooked layer placed on the upper band, the said layer then being deposited on the precooked layer placed on the lower band. Located at the means for returning the upper band, there may be means for lateral separation of the layer which consist, for example, of fixed blades housed so as to face the lateral edges of the hollow part of the band.

Of course, what has now been said for two bands, corresponding to two layers, can be multiplied as many times as there are layers to be superposed. In the case of three layers, the second band above is itself located above and inclined towards a third band, which is now the lower band. The band supporting the lowest layer of the product can be rectilinear: extraction of all the superposed precooked layers is effected by the separating means, either before or after passage through the complementary heating means.

The complementary heating means consist, for example, of a microwave cavity.

At the outlet of the heating means, there are cutting means capable of cutting the cooked continuous product into individual products of the desired length and width and, if appropriate, automatic wrapping and packaging means.

In a first embodiment of a continuous band, each band is an endless band in the form of a closed loop made of a flexible material, for example rubber, and having a hollow cross-section. The material must be sufficiently flexible to withstand the variations due to the closed loop form.

In a second embodiment of a continuous band, each band is a band of flat and flexible material and the installation includes means for deforming the band which are capable of giving it the shape of a continuous container, and means for keeping the band in shape while it moves from the feed zone to the outlet of the precooking means. For example, the material is a band of paper whose side in contact with the liquid egg products has a non-stick coating complying with the food standards. This paper can be discarded after use.

The invention will be understood more clearly from the following description of an embodiment of the installation for the manufacture of a complex egg-based product of square cross-section, illustrated by the attached drawing; in this drawing.

The two vats 1 and 2 are both equipped with a stirrer 3 and are thermostated so as to keep the fresh liquid egg products which they contain at a temperature below 10° C. The vats 1 and 2 respectively contain fresh liquid egg white 4 and fresh liquid egg yolk 5. The liquid egg products come from breakers where the eggs are broken, the whites and yolks being separated, homogenized and kept at a low temperature of the order of 4° C. so as to ensure good keeping properties. Of course, it is possible to add ingredients such as salts, spices etc. to the liquid egg products. Each vat 1 and 2 is equipped with a pipe, 6 and 7 respectively, for feeding the liquid egg products onto the corresponding bands. The pipe 6 has two branches 6a and 6b, one of them 6a, feeding the upper band 8 and the other feeding the lower band 10. The pipe 7 feeds the intermediate band 9. Each pipe 6 and 7 has opening and closing means, 11 and 12 respectively.

Figure 2:
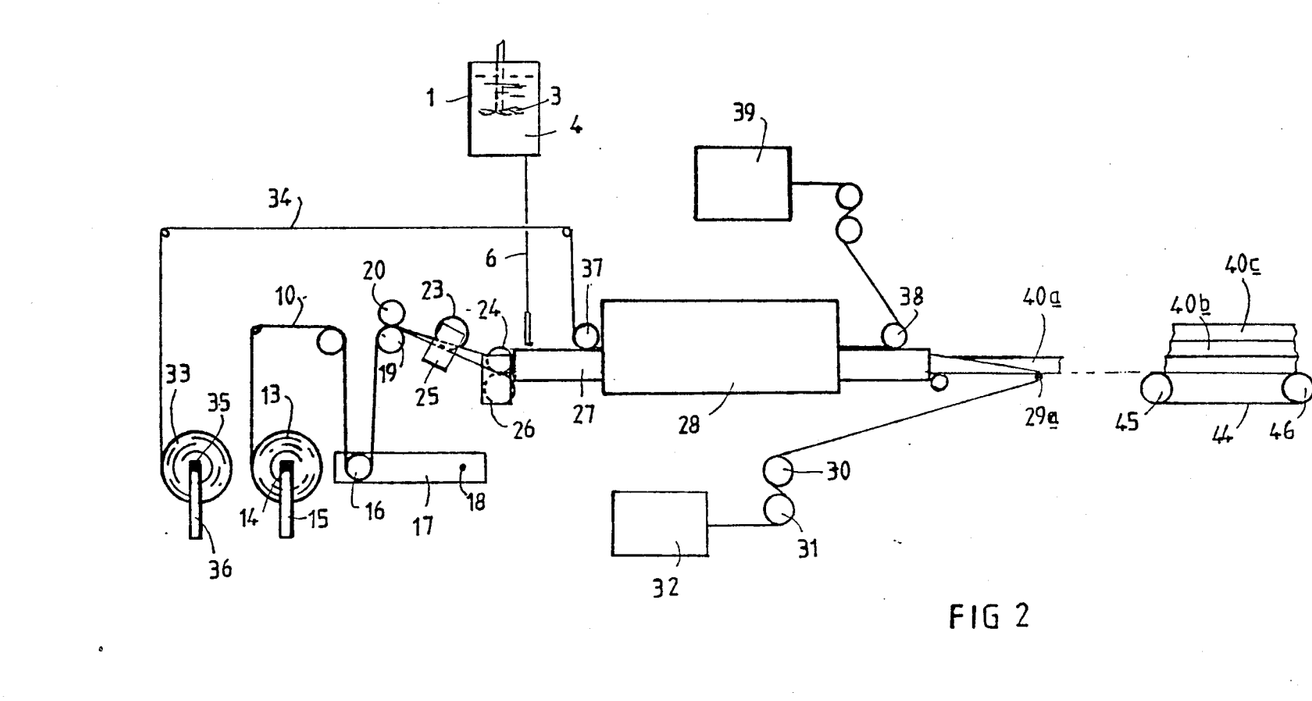
FIG. 2 is a schematic view of that part of the installation which relates to a band.

A part of the installation which is illustrated by FIG. 2, and which is repeated three times in the installation, will now be described in detail. Each of these parts corresponds to the use of a continuous band of paper, deformed so as to serve as a continuous container for a fresh liquid egg product, and hence to the carrying out of the first two steps of the process of the invention—feeding and precooking—for a given layer. This description will refer to a layer of egg white, which relates to the lower part of the installation.

In front of the frame, at the left-hand end in FIG. 2, a spool 13, forming a reel for the band of paper 10, is fitted over the rotating axle 14 of the spool support 15.

The band of paper 10 has a width of about 162 mm. On its side facing away from the spool 13, the paper is coated with polyethylene, limiting the impregnation of the paper by the liquid egg white.

The band 10 is supported and drawn by a set of rollers fixed to the frame. Among these, the roller 16 regulates the tension of the band 10 while it is in motion. The two ends of the rotating axle of this roller 16 are mounted on bearings fixed to arms 17 pivoting about a horizontal axis 18. If appropriate, counter-weights are mounted, on the arms 17 or on an axle joining the two arms 17, at the end opposite to the pivoting axis 18.

Figure 3:
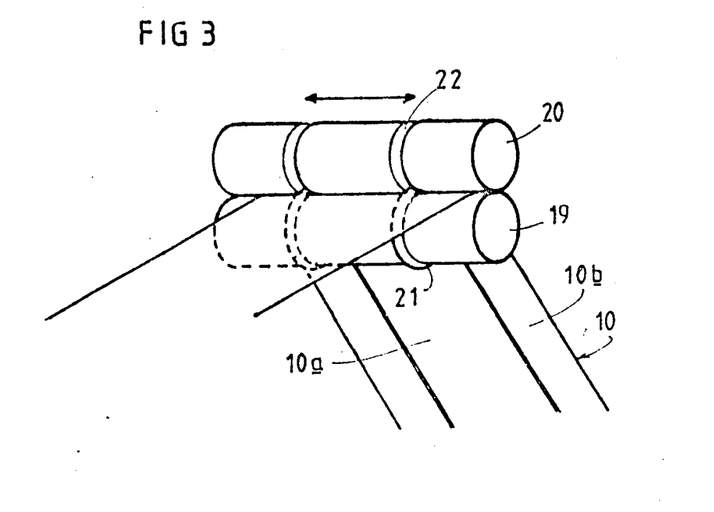
FIG. 3 is a schematic perspective of the means for deforming a band.

The two press-rollers 19 and 20 have parallel and horizontal axes of rotation. They rotate in opposite directions and bear against one another. Along two directrices separated by a distance e, i.e. 121 mm, the lower roller 19 has two overthicknesses 21, each one having a triangular cross-section running around the whole periphery of the roller. Facing the two overthicknesses 21 on the roller 19, the upper roller 20 has two recesses 22 whose shape complements that of the said overthicknesses 21. Thus, when the two rollers 19 and 20 are caused to rotate, the overthicknesses 21 on the roller 19 fit into the recesses 22 in the roller 20.

The rollers 23 and 24, located along the path of the band 10, have a width equal to the separation e above. Flanges 25 and 26 are provided on either side of the rollers 23 and 24 respectively, the first flange 25 being oblique relative to the horizontal and the second flange 26 being vertical.

A quartz rod 27 is fixed horizontally to the frame, immediately downstream of the roller 26 and longitudinally relative to the band 10. It passes through the microwave cavity 28, which is connected to generators (not shown). The rod 27 has a U-shaped cross-section, the internal recess having a width slightly greater than the separation e and a height equal to at least half the difference between the width of the band 10 and the separation e. The top part of the two arms of the U preferably has an extension turned down towards the inside of the U, which is capable of preventing the raised edges of the band from folding in towards the central part.

Downstream of the rod 27, the rod 29 is located transversely relative to the band 10. The height of this rod 29 differs according to which layer the part of the installation concerns, as will be indicated below.

Two traction rollers 30 and 31 and a shredding device 32 are located on the band 10, downstream of the rod 29, in the direction of motion of the said band 10.

In front of the frame, even further to the left than the spool support 15, a spool 33, forming a reel for the band of paper 34, is fitted over the rotating axle 35 of the spool support 36.

The band of paper 34 is of the same type as the first band 10. Due to the polyethylene coating, it is impermeable to steam. The band 34 is supported and drawn by a set of rollers fixed to the frame. Among these, the rollers 37 and 38 are located transversely relative to the hollowed rod 27, and just above the latter, at the inlet and outlet respectively of the microwave cavity 28. Another shredding device, 39, is associated with the band 34.

During operation of the installation, the first band of paper 10 is unwound from the spool 13 to the shredding device 32. It passes successively over the tension roller 16, between the press-rollers 19 and 20 and through the microwave cavity 28. On leaving the spool 13, the band 10 is flat. When it passes between the press-rollers 19 and 20, the male and female molding parts, namely the overthicknesses 21 and the recesses 22, produce two longitudinal marks in the band 10, which are parallel to the borders of the band and separated from one another by the distance e, i.e. 121 mm. Means for guiding the band 10 are provided for centering the band 10 exactly relative to the molding parts.

The flanges 25 raise the edges 10b of the band 10, while the roller 23 keeps the central part 10a of the band 10 horizontal. Similarly, the flanges 26 bring the edges 10b vertical relative to the central part 10a.

The band 10, in this U-shaped configuration, is then supported by the internal part of the hollowed rod 27. Downstream of the outlet of the microwave cavity 28, the hollowed rod 27 can have integrated heating means, for example a heating jacket, making it possible to keep the layer contained in the internal part of the said rod 27 at a temperature close to that which it had in the cavity 28, for example 73° C.

The band 10 passes flat over the rod 29 and is drawn by the traction rollers 30 and 31 towards the shredding device 32. The traction rollers here are stainless steel rollers whose surface is furnished with nails so that the band 10, anchored on these nails, is drawn uniformly over its whole width. It is seen that, between the downstream end of the rod 27 and the rod 29, the edges 10b of the band 10 are no longer held in the vertical position and they twist until their initial position is restored.

This part of the installation operates in the following manner. With the valve 11 open, the fresh liquid egg white, stored in the vat 1, is sent through the pipe 6b into the container formed by the U-shaped band 10.

The feed rate of the liquid egg depends on the cross-section of the desired finished product and on the speed of travel of the band 10, which itself depends on the power of the microwave radiation. In a specific example, the flow rate of the liquid egg was 0.21 l/min for a speed of travel of the band 10 of 0.3 m/min and a power at the microwave generators of 1.2 kW.

The liquid egg contained in the band 10 coagulates when the latter passes through the cavity 28. The band 34 takes up a position above the top part of the rod 27 and forms a cover which is substantially impermeable to the steam created when the liquid egg is heated. This particular arrangement permits a reduced loss of steam and a better presentation of the surface of the upper face of the finished product 40 leaving the cavity.

On leaving the microwave cavity 27, the second band 34 is sent towards the shredding device 39; the finished product 40 is a continuous bar of coagulated egg white which has not yet been completely cooked hard; it is flexible but its consistency is such that it remains in the shape given to it by the band 10, i.e., in the present example, with a rectangular cross-section 121 mm wide and 6 mm high. Between leaving the rod 27 and passing over the rod 29, the edges 10b of the first band 10, which were vertical, are flattened. When it passes over the rod 29, the band 10 undergoes a very large change of angle, of the order of 120° to 170°, relative to its initial direction; this sudden change in direction enables the finished product 40 to separate perfectly from the band 10. After it has passed over the rod 29, the band 10 is sent towards the shredding device 33.

In the installation, the three partial systems 41, 42 and 43 (FIG. 1) of the installation, each of which is capable of forming a precooked layer, are combined in the following manner. The direction of the first band 10a of the lower system 43 is kept substantially horizontal between the retaining rod 27 and the corresponding guide rod 29a. The intermediate system 44 is located above the lower system 43 and the direction of its band 9, downstream of the corresponding rod 27, is oblique up to the corresponding guide rod 29b, which is located just above the band 10, upstream of the guide rod 29c. The upper system 45 is located above the intermediate system 44 and the direction of its band 8, downstream of the corresponding rod 27, is oblique up to the corresponding guide rod 29c, which is located just above the band 10, between the two guide rods 29b and 29c.

Figure 1:
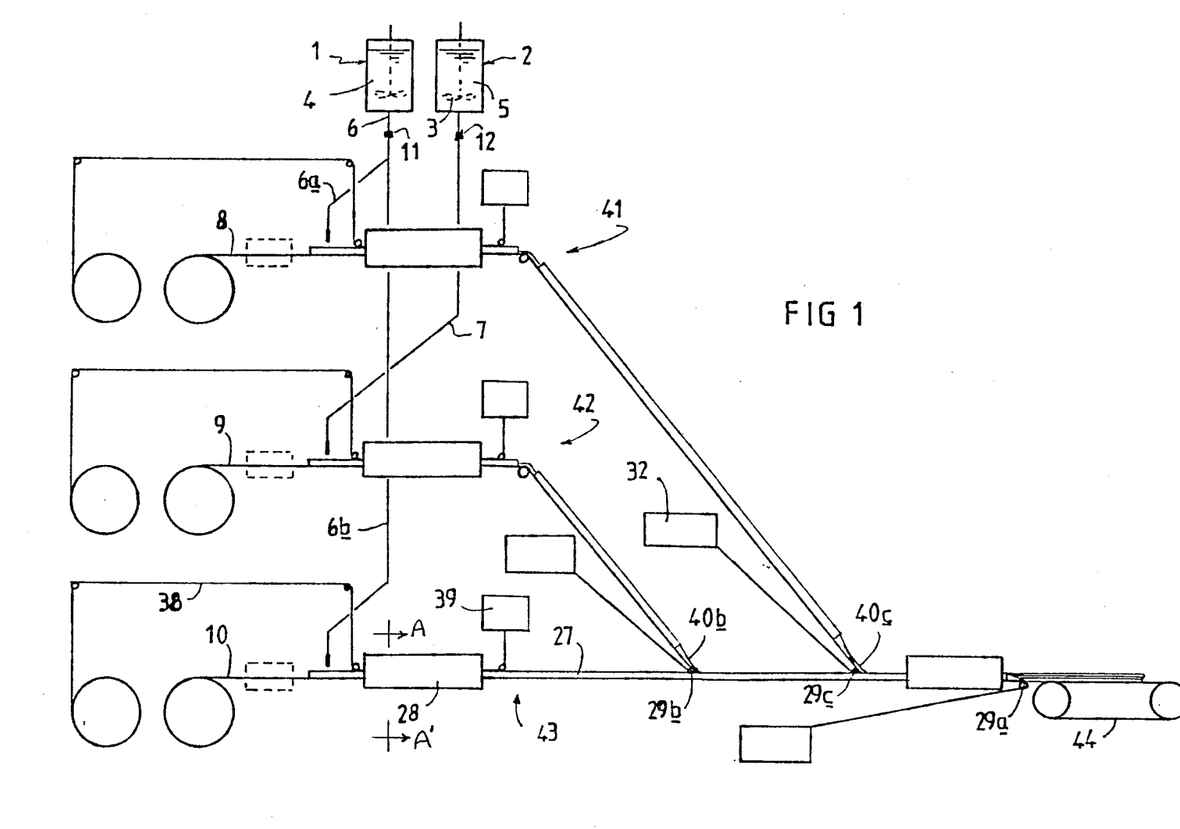
FIG. 1 is a simplified schematic side view of the installation, comprising three bands.

The upper and lower shaped bands 8 and 10 are fed with liquid egg white; the intermediate band 9 is fed with liquid egg yolk.

The combined operation of the three systems 41, 42 and 43 is as follows. The bar of shaped precooked egg white 40a leaving the microwave cavity of the lower system 43 is conveyed horizontally to the corresponding guide rod 29a. The bar of shaped precooked egg yolk 40b leaving the intermediate system 42 is conveyed obliquely and descends to the corresponding guide rod 29b just above the bar of egg white of the lower system 43. The sudden change in direction of the band 9 around the rod 29b causes the separation of the bar of egg yolk 40b, which is superposed simply by being deposited on the lower bar 40a. Similarly, the bar of egg white 40c leaving the upper system 41 is superposed simply by being deposited on the intermediate bar 40b, already superposed on the lower bar 40a. This effects the superposing of the three alternate layers of precooked egg white and yolk. Prior to the bar of egg white 40c being deposited, the complexing can be improved by drying the said bar 40c from underneath. This drying is achieved, for example, by blowing hot air under the bar 40c after it has been separated from the corresponding band 8 and before it has been deposited on the bar of egg yolk 40b. If necessary, a perforated support consisting, for example, of transverse rods, over which the bar of egg white 41c moves, is placed in the path of the bar 41c, downstream of the separating rod 29c.

A heat treatment chamber, for example a microwave cavity of the same type as that described above, has been placed between the two guide rods 29c and 29a, i.e. in the zone where the three layers are superposed and lie on the lower band 10 only. This chamber brings the precooked complex product to the desired degree of cooking so as to effect the complexing of the layers 40a, 40b and 40c with one another.

Immediately downstream of the last guide rod 29a, in the same direction, a conveyor belt 44 is supported and tensioned between two rollers 45 and 46, at least one of which is caused to rotate by means which are not shown. After separation from the band 10 when it passes over the guide rod 29a, the finished product is conveyed on the belt 44 towards another station, where it will be cut to the desired length and, if appropriate, to the desired width, and wrapped and packaged by any suitable means.

For the manufacture of a cube-shaped product, namely an aperitif snack, each band had an internal width 10a of 121 mm, the height of liquid egg in the band was 5.6 mm and the product was cut to equal widths of 17 mm and equal lengths of 17 mm.

The invention is not limited to the embodiment which has now been described, but covers all the variants thereof.

The fresh liquid egg white 4 and egg yolk 5 can be preheated before the precooking step, for example by passing the pipes 6 and 7 through an exchanger, and brought to a temperature of the order of 45° C.

In particular, the support band 10 can be a continuous band, but in the form of a closed loop supported by guide rollers. For example, it will be made of rubber and have a hollow relief such that its cross-section is U-shaped.

The band of paper or rubber advantageously has a slight inclination, being higher in the feed zone, at the roller 24, than in the microwave cavity 28, so that it forms an angle of a few degrees relative to the horizontal. This inclination favors a constant feed by preventing any liquid egg from spreading upstream of the feed zone, and thereby ensures a good homogeneity in terms of the height of the precooked layer.

Of course, it is possible to make complex egg-based products of a different structure by modifying the number of layers, the shape of each layer, etc., without deviating from the framework of the invention.

Figure 4:
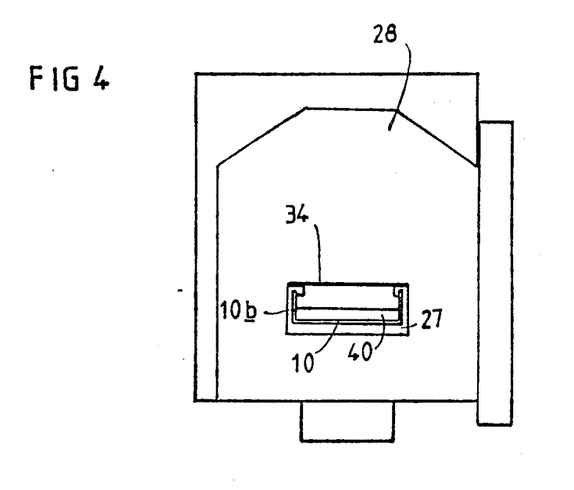
FIG. 4 is a view in section of a cavity along the axis AA' of FIG. 1.

The cavity 28 shown in FIG. 4 is a resonant cavity supplied by at least one slotted radiating and calorific guide, the container being positioned inside the cavity 28 in such a way that the action of the microwaves is homogeneous throughout the whole volume of the product 40. It is possible to use other types of cavity to produce an equivalent result.

what is claimed is:

1. A continuous process for the manufacture of a complex egg-based product in the form of superposed and alternate layers of white and yolk in the hard cooked state including:
   (a) a feeding step comprising continuously feeding n1 moving containers with fresh liquid egg white and n2 moving containers with fresh liquid egg yolk, each of the said containers comprising a continuous endless band having a hollow relief having the same shape and being made of a material inert to microwaves, the sum $n = n1 + n2$ being equal to at least two and n1 being equal to n2 or different from n2 by one unit,
   (b) a precooking step comprising passing the n moving endless bands through at least one chamber (22) supplied with microwaves so that each liquid egg product coagulates in the container, in the form of a homogenous layer, without however reaching the hard cooked state,
   (c) a superposing step comprising extracting the moving layers from the containers and superposing the extracted layers so that a layer based on liquid egg white alternates with a layer based on liquid egg yolk,
   (d) a complexing step comprising subjecting the layers superposed in this way to a complementary heat treatment to achieve the desired degree of cooking white while at the same time ensuring the complexing of the different layers to provide a continuous product, and
   (e) a cutting step comprising cutting the continuous product contained after complexing into individual products of the desired length.

2. The process according to claim 1 wherein, during the precooking step, each liquid egg product is kept in an atmosphere of saturated steam.

3. The process according to claim 1 or claim 2 wherein, with the hollow part of each container having a rectangular cross-section, the feed of fresh liquid egg into each of the n containers is such that the height of the liquid egg in each container is equal to 1/n times the width of the container, whereby the complex product obtained has a square cross-section in which each superposed layer has the same dimensions.

4. The process according to claim 1 or claim 2 wherein, with the n continuous bands (8, 9, 10) located one above the other, the superposing of a first layer corresponding to an upper band (8) on a second layer corresponding to a lower band (9) is achieved by demolding the first layer and depositing the first layer, now demolded, on the second layer situated in the lower band (9).

5. The process according to claim 4 wherein, before it is demolded and superposed, each layer is kept at a temperature close to the coagulation temperature of 73° C.

6. The process according to claim 4 wherein, after demolding, the bottom side of the first layer corresponding to an upper band (8) is dried before being deposited on the second layer situated in the lower band (9).

7. The process according to claim 1 or claim 2 wherein the complementary heat treatment for cooking consists of the action of microwaves.

8. An installation for the manufacture of a complex egg-based product in the form of superposed and alternate layers of white and yolk in the hard cooked state, which comprises:
   (a) means for separately feeding fresh liquid egg white (4) and fresh liquid egg yolk (6) to n moving containers (8,9,10) of identical shape, made of a material inert to microwaves, n being equal to or greater than 2, there being n1 containers for the while and n2 containers for the yolk, the sum $n = n1 + n2$ and n1 being equal to n2 or different from n2 by one unit,
   b. a chamber (22) supplied with microwaves
   c. means for passing said moving containers through said chamber to precook the liquid egg products present in the containers by means of microwaves so that each liquid egg product coagulates homogenously in the container without reaching the hard cooked state,
   d. means for superposing the precooked liquid egg products in layers,
   e. means (34) for subjecting the superposed layers to a further heat treatment to ensure the complexing of the different layers and to achieve the desired degree of cooking to provide a continuous product, and
   f. means for cutting the continuous product obtained after complexing into individual products of the desired length.

9. The installation according to claim 8 wherein the means for separately feeding fresh liquid egg products comprise two separate tanks, one (1) for containing the liquid egg whites (4) and the other (2) for containing the liquid egg yolks (5), means (3) for stirring the liquid egg products contained in each tank and the actual means (6, 7) for feeding the liquid egg products into the n containers.

10. The installation according to claim 8 wherein each container consists of a continuous band (10) made of a flat and flexible material, the said installation comprising transverse deformation means so as to give the band the shape of a continuous container, means for keeping the band in this configuration while it moves through the precooking means, and means for supporting and moving each band.

11. The installation according to claim 10 wherein each continuous band is made of paper having a non-stick coating on the side in contact with the liquid egg.

12. The installation according to claim 10 or claim 11 wherein the deformation means consist of:
   (a) two press-rollers (19, 20) which have, along at least two directrices, in one case (19) an overthickness (21) forming a male molding part and in the other case (20) a recess (22), facing the overthickness (21), forming a female molding part,
   (b) means for guiding the band, which are located so that the folds formed on the band by the molding parts of the press-rollers are parallel to the edges of the band and in the desired arrangement, and
   (c) bearing means (25, 26) which are located along the path of the band and on each side thereof, downstream of the press-rollers (19, 20), and are capable of raising the edges (10b) of the band.

13. The installation according to claim 8 wherein each container consists of an endless band in the form of a closed loop made of a flexible material, and having a hollow relief, and the installation has means for supporting and moving each band.

14. The installation according to claim 8 wherein the means for precooking by microwaves consist of a resonant cavity (22) located downstream of the feed zone, in the direction of motion of the band.

15. An installation according to claim 8 wherein the chamber comprises a microwave cavity provided with means for producing steam or preserving the steam released during precooking, which are capable of maintaining an atmosphere of saturated steam around the container during precooking.

16. The installation according to claim 15 wherein the means capable of maintaining an atmosphere of saturated steam around the container during precooking consist of a plate, forming a cover, which is made of a material inert to microwaves and is placed on top of and around the container during the action of the microwaves.

17. The installation according to claim 15 wherein the means capable of maintaining an atmosphere of saturated steam around the container during precooking consist of a flat and continuous band (34) made of a material impermeable to steam and inert to microwaves, which is provided with means of displacement (37, 38) capable of positioning the said band (34), as it moves above the container (10), in such a way as to form a cover.

18. The installation according to claim 10 or claim 13 wherein the band has an inclination between the feed zone and the zone where the microwaves are active, being higher in the feed zone.

19. The installation according to claim 10 or claim 11 wherein there are a plurality of bands and a corresponding number of said chambers, a first band (9) corresponding to a given layer being located above a second band (10) corresponding to an adjacent layer, so that, on leaving the corresponding microwave chamber (28), the first band (9) is located just above and inclined towards the second band (10), which is itself leaving the corresponding microwave chamber (28).

20. The installation according to claim 8 wherein the further heat treatment means for cooking consist of a microwave cavity.

21. The process according to claim 4 wherein the complementary heat treatment for cooking comprises the action of microwaves.

* * * * *

UNITED STATES PATENT AND TRADEMARK OFFICE
CERTIFICATE OF CORRECTION

PATENT NO. : 4,935,253

DATED : June 19, 1990

INVENTOR(S) : Frederic Dumas, Franck Bouttemy, Jean-Francois Rochas, Jean-Marie Jacomino, Christian Huc It is certified that error appears in the above-identified patent and that said Letters Patent is hereby corrected as shown below:

Column 9, line 29, delete "white".

Column 9, line 33, "contained" should read -- obtained --.

Signed and Sealed this

Twentieth Day of August, 1991

Attest:

HARRY F. MANBECK, JR.

*Attesting Officer*   *Commissioner of Patents and Trademarks*